Patented July 6, 1954

2,683,096

UNITED STATES PATENT OFFICE 2,683,096

COATED FIBRO-CEMENT PRODUCT AND PROCESS OF MAKING SAME

Clarence Roy Eckert, Englewood, and Phillip Stephen Bettoli, Belle Mead, N. J., assignors to The Ruberoid Co., New York, N. Y., a corporation of New Jersey No Drawing. Application February 6, 1952, Serial No. 270,296

15 Claims. (Cl. 117—70)

This invention relates to a coated fibro-cement product and process of making same, and more particularly to an asbestos-cement siding shingle having its weather surface covered with a colored coating.

Heretofore such products have generally been coated with silicate coating compositions. Among the objections to the silicate type of coatings are that they tend to retrogress in storage, and that they require relatively high temperatures applied for a considerable period of time in order to set and harden them.

One object of our invention is to provide an asbestos-cement siding shingle, or the like, having a phosphate coating that is highly resistant to retrogression, that is durable and weather resistant, and that is hard, glossy, and adheres firmly to the base.

A further object of our invention is to provide a process of manufacturing such product at reduced cost and at a higher rate of production. According to our process the coating is indurated and insolubilized at a lower temperature and in less time than is required in any process heretofore used for coating asbestos-cement products. Lower temperature not only results in economy in fuel but also avoids the detrimental effect of higher heat on the strength of the cement. Moreover, severe warpage of the product in the baking operation is practically eliminated.

The product comprises a base of cured asbestos-cement, composed of cement and asbestos, and while the preferred embodiment of the base comprises Portland cement admixed with asbestos fibers, any other hydraulic cement manifesting alkaline characteristics and having asbestos embodied therein may be utilized. Asbestos-cement even after it has been cured either by normal or by steam curing, contains moisture usually up to about 10%, and a certain amount of alkaline material, such as free lime. Because of the presence of these in the base we have found it necessary to give the base a preliminary surface conditioning treatment before application of the colored coating or paint. Such treatment not only conditions the base but serves to provide a priming coat for the subsequent application of the colored coating composition.

To condition the base we give it a treatment with an aqueous solution of a salt, such as an inorganic salt of the group consisting of aluminum chloride, ferric chloride, and magnesium, zinc, or ammonium silico-fluoride. It will be noted that the aluminum chloride and ferric chloride are in the category of trivalent metal salts, and the aforesaid silico-fluorides of magnesium and zinc comprise the salts of divalent metallic elements, while the ammonium silico-fluoride is indicative of the salt of a monovalent element. These substances may be used in different percentages of solution concentration and in varying amounts. We have found that very good results are obtained by conditioning the base with use of a 15% solution of aluminum chloride in an amount of about 12 grams per square foot of surface. Aluminum chloride does not affect the color of the base, however, ferric chloride tends to darken the base. While we prefer to employ the salt pre-treatment, treatment with a suitable acid solution may at times be used.

The colored coating or paint composition comprises a mixture of aluminum hydrate, an aqueous solution of orthophosphoric acid ($H_3PO_4$), water, and pigments such as titanium oxide ($TiO_2$), and other suitable inorganic pigments, with or without the addition of pigment extenders and fillers. The aluminum hydrate and orthophosphoric acid react to form a colloidal aluminum phosphate which will not precipitate and which constitutes the vehicle for the pigments. The ingredients may be used in varying proportions and amounts depending upon the color of the coating. The viscosity of the composition is such that it may be applied by spraying, and it is quite stable in that it may be kept for a considerable period up to about thirty-six hours without appreciable thickening. Furthermore the composition is compatible with the asbestos-cement of the base. While we are aware that phosphate or phosphoric acid paints or coatings have heretofore been proposed, we do not know of any such prior coating that is stable and compatible with asbestos-cement. Most of the prior coatings tend to age or thicken rapidly so as to make them impractical to be sprayed. Because of the fact that the coating is stable, a time element may intervene between the step of conditioning the base and that of applying the coating composition. The orthophosphoric acid is used in the form of an aqueous solution of about 75% $H_3PO_4$, although the amount of concentration may be varied and at times we may use 85% $H_3PO_4$. When the water in the acid is increased or decreased the water in the mixture should be changed accordingly. Among the ingredients that may be added as pigment extenders or fillers to the composition to produce various colors are slate dust, amorphous silica and water ground mica.

We have successfully used coloring compositions, depending upon the color, containing aluminum hydrate in amounts by weight from about 23% to 28%, phosphoric acid in amounts from about 29% to 36%, water in amounts of from 27% to 31%, and titanium oxide in amounts of about 3% to 5.5%, and other pigments, pigment extenders, and fillers in amounts totalling about 10% to 20%, in the cases where such other ingredients are used.

After the base has been conditioned and coated the final step consists of heat treating or baking the coated product to insolubilize, set and harden the coating. This may be effected in a suitable oven. The preferred heating is done in two successive stages each of the duration of about five to ten minutes. At the first stage the product is heated to a temperature in the approximate range of about 180° to 200° F. to accomplish a preliminary set of the coating and in the second or final stage to a temperature in the approximate range of about 380° F. to 400° F. The elapsed time and the temperatures used as hereinbefore noted are considerable lower than those generally employed for coating asbestos-cement products with a resultant economy in the cost of manufacture and increase in rate of production.

Concerning the terminology in the foregoing consideration as well as in the appended claims, the reference to cement is intended to designate a hydraulic cement manifesting alkalinity as an inherent characteristic thereof, and a principal example thereof which represents a preferred embodiment applicable to the present invention is Portland cement. Thus fibro-cement contemplates a hydraulic cement as aforesaid embodying relatively inert fibers therein, and by the same token asbestos-cement comprises such a hydraulic cement containing asbestos, which may desirably be in the form of fibers.

It is to be understood that various modifications in the product and process hereinbefore described may be made by those skilled in the art within the scope of or in our invention.

What we claim is:

1. A coated fibro-cement product comprising a base of set hydraulic cement and fibers, said base having a surface coating of heat-reaction product of a mixture of aluminum hydrate, phosphoric acid, water, and inorganic pigment, said cement base having a priming coat of an aqueous solution of an inorganic salt from the group consisting of chlorides of trivalent metals and silico-fluorides of divalent and monovalent elements, said chlorides and silico-fluorides being adapted to condition the moisture content and alkalinity of the cement base for the said surface coating.

2. A coated fibro-cement product comprising a base of set hydraulic cement and fibers, said base having a priming coat of a salt selected from the group consisting of aluminum chloride, ferric chloride, magnesium silico-fluoride, zinc silico-fluoride, and ammonium silico-fluoride, and an outer coat of the indurated insolubilized heat-reaction product of a mixture of aluminum hydrate, phosphoric acid, water, and inorganic pigment.

3. A coated fibro-cement product comprising a base of Portland cement and asbestos fibers, said base having a priming coat of aluminum chloride, and an outer coat of the indurated insolubilized heat-reaction product of a mixture of aluminum hydrate, orthophosphoric acid, water, and inorganic pigments.

4. A coated fibro-cement product comprising a base of set asbestos-cement, said base having a priming coat of 15% aqueous solution of aluminum chloride, and an outer coat of the indurated insolubilzed heat-reaction product of a mixture of about 23%–28% aluminum hydrate, about 29%–36% orthophosphoric acid, about 27%–31% water, and about 3%–20% inorganic pigments and fillers.

5. A coated fibro-cement product comprising a base of set asbestos-cement, said base having a priming coat of a salt selected from the group consisting of aluminum chloride, ferric chloride, magnesium silico-fluoride, zinc silico-fluoride, and ammonium silico-fluoride, and an outer coat of the indurated heat-reaction product of a mixture of aluminum hydrate, orthophosphoric acid, water, titanium oxide, and inorganic fillers.

6. The process of making a coated fibro-cement product which consists in giving a base of set hydraulic cement and fibers a surface conditioning treatment with an aqueous solution of aluminum chloride, applying on the conditioned surface a coating of a mixture of aluminum hydrate, phosphoric acid, water, and pigment, and subjecting the coated product to heat in two successive stages each of about five to ten minutes duration, the first stage having an approximate temperature range of about 180° to 200° F. and the second stage having a temperature range of about 380° to 400° F.

7. The process of making a coated fibro-cement product which comprises applying to a base of set asbestos cement a priming coat of an aqueous solution of an inorganic metal salt from the group consisting of chlorides of trivalent metals and silico-fluorides of divalent and monovalent elements, said chlorides and silico-fluorides being adapted to condition the moisture content and alkalinity of the cement base for the subsequently applied surface coating, then applying the said surface coating comprising a mixture of aluminum hydrate, phosphoric acid, pigment and water, and subjecting the resultant coated base to a substantial temperature heat treatment for indurating and insolubilizing the said surface coating.

8. The process of making a coated fibro-cement product which comprises applying to a base of set asbestos cement a priming coat of an aqueous solution of an inorganic metal salt from the group consisting of chlorides of trivalent metals and silico-fluorides of divalent and monovalent elements, said chlorides and silico-fluorides being adapted to condition the moisture content and alkalinity of the cement base for the subsequently applied surface coating, then applying the said outer surface coating comprising a mixture of aluminum hydrate, phosphoric acid, pigment and water, and subjecting the said coated base to a plural stage increasing temperature heat treatment for indurating and insolubilizing the said surface coating, the final stage having an approximate temperature range of 380° to 400° F.

9. The process of making a coated asbestos cement product which comprises applying to a base of set asbestos cement a priming coat of an aqueous solution of a salt, adapted to condition the moisture content and alkalinity of the cement base for the subsequently applied surface coating, selected from the group consisting of aluminum chloride, ferric chloride, magnesium silico-fluoride, zinc silico-fluoride and ammonium silico-fluoride, then applying the said surface coating comprising a mixture of aluminum hydrate, phosphoric acid, pigment and water, and subjecting the resultant coated product to a plural stage increasing temperature heat treatment for indurating and insolubilizing the said surface coating, the final stage having an approximate temperature range of 380° to 400° F., the combined total heating time for the plural stages of heating being approximately ten to twenty minutes.

10. The process as in claim 7, wherein the heat treatment comprises two successive stages each of about five to ten minutes duration, the first stage having an approximate temperature range of about 180° to 200° F. and the second stage having an approximate temperature range of about 380° to 400° F.

11. The process of making an asbestos-cement shingle which comprises applying to a base of set hydraulic cement, having embodied therein asbestos fibers, a priming coat of an aqueous solution of a salt, adapted to condition the moisture content and alkalinity of the cement base for the subsequently applied surface coating, said salt being selected from the group consisting of aluminum chloride, ferric chloride, magnesium silico-fluoride, zinc silico-fluoride, and ammonium silico-fluoride, then applying the said surface coating comprising an aqueous mixture containing an amount of the respective ingredients in the designated approximate percentage ranges of 27% to 31% water, 23% to 28% aluminum hydrate, 29% to 36% orthophosphoric acid, 4% to 5.5% titanium oxide, and 10% to 20% pigment extenders from the group consisting of slate dust, amorphous silica and water ground mica, and subjecting the resultant coated product to a plural stage increasing temperature heat treatment for indurating and insolubilizing the said surface coating, the final stage having an approximate temperature range of 380° to 400° F., the combined total heating time for the plural stages of heat treatment being approximately ten to twenty minutes.

12. The process as in claim 11, wherein the asbestos-cement is Portland cement containing asbestos fibers and wherein the heat treatment comprises two successive stages each of about five to ten minutes duration, the first stage having an approximate temperature range of 180° to 200° F. and the second stage having an approximate temperature range of about 300° to 400° F.

13. A coated fibro-cement product as in claim 2, comprising an asbestos-cement shingle.

14. A coated fibro-cement product as in claim 4, comprising an asbestos-cement shingle wherein the base comprises Portland cement having asbestos fibers embodied therein.

15. An asbestos-cement shingle comprising a base of set Portland cement having asbestos fibers embodied therein, said base having a priming coat of a solution of aluminum chloride, and an outer coat of the indurated insolubilized reaction product comprising a mixture containing an amount of the respective ingredients in the designated approximate percentage ranges of 23% to 28% aluminum hydrate, 29% to 36% orthophosphoric acid, 3% to 5.5% titanium oxide, 10% to 20% pigment extenders from the group consisting of slate dust, amorphous silica and water ground mica, and 27% to 31% water.

References Cited in the file of this patent

UNITED STATES PATENTS

| Number | Name | Date |
|---|---|---|
| 703,200 | Heany | June 24, 1902 |
| 2,019,852 | Harrap | Nov. 5, 1935 |
| 2,126,191 | Hubbell | Aug. 9, 1938 |
| 2,161,290 | Grimm et al. | June 6, 1939 |
| 2,372,284 | Marc | Mar. 27, 1945 |